(12) United States Patent
Pfluger

(10) Patent No.: US 7,381,899 B2
(45) Date of Patent: Jun. 3, 2008

(54) CABLE GUIDING DEVICE

(76) Inventor: Gerd Pfluger, Banhofstrasse 216, Oberbuchsiten, CH-4625 (CH)

( * ) Notice: Subject to any disclaimer, the term of this patent is extended or adjusted under 35 U.S.C. 154(b) by 0 days.

(21) Appl. No.: 11/673,122

(22) Filed: Feb. 9, 2007

(65) Prior Publication Data
US 2007/0184714 A1 Aug. 9, 2007

(30) Foreign Application Priority Data
Feb. 9, 2006 (CH) .................................. 0210/06

(51) Int. Cl.
*H01R 4/00* (2006.01)
(52) U.S. Cl. .................................................. 174/92
(58) Field of Classification Search ............ 174/74 R, 174/75 R, 76, 77 R, 78, 79, 84 R, 88 R, 174/92
See application file for complete search history.

(56) References Cited

U.S. PATENT DOCUMENTS

| | | | |
|---|---|---|---|
| 1,189,208 A * | 6/1916 | Hodkinson | 138/157 |
| 5,086,195 A * | 2/1992 | Claisse | 174/101 |
| 5,126,507 A * | 6/1992 | Kirma | 174/2 |
| 5,792,992 A * | 8/1998 | Handler | 174/101 |
| 6,084,180 A * | 7/2000 | DeBartolo et al. | 174/95 |
| 6,143,984 A * | 11/2000 | Auteri | 174/68.3 |
| 6,215,069 B1 * | 4/2001 | Martin et al. | 174/68.3 |
| 6,233,791 B1 * | 5/2001 | Theis | 24/135 R |
| 7,075,010 B2 * | 7/2006 | Santelli, Jr. | 174/72 R |

FOREIGN PATENT DOCUMENTS

| | | |
|---|---|---|
| DE | 2483134 | 1/1976 |
| DE | 10101085 A1 | 8/2002 |
| EP | 0746074 A2 | 12/1996 |
| EP | 1168555 A1 | 1/2002 |
| EP | 1505705 A1 | 2/2005 |
| GB | 2117026 A | 10/1983 |
| GB | 2137305 A * | 10/1984 |
| GB | 2287727 A | 9/1995 |

* cited by examiner

Primary Examiner—William H Mayo, III

(57) ABSTRACT

A cable guiding device with a cable guiding portion, such as a duct, that serves for guiding installed cables and that is mounted by a mounting device to a part of a building, such as a wall or ceiling. The mounting device has a holder having an upper portion, a lower portion and at least two opposing side walls, which define a cavity with a longitudinal axis substantially parallel to the axis of the mounted cable guiding portion. The holder further has at least one longitudinal slot disposed at an angle relative to the longitudinal axis. The slot extends the length of the holder and provides access to the cavity which is dimensioned to receive and at least partially envelope a cable disposed therein. The cable guiding portion, which has a bottom and first and second side walls, is attachable to the holder so as to cover the slot opening. The cable guiding portion is dimensioned to clutch at least a portion of the holder.

19 Claims, 9 Drawing Sheets

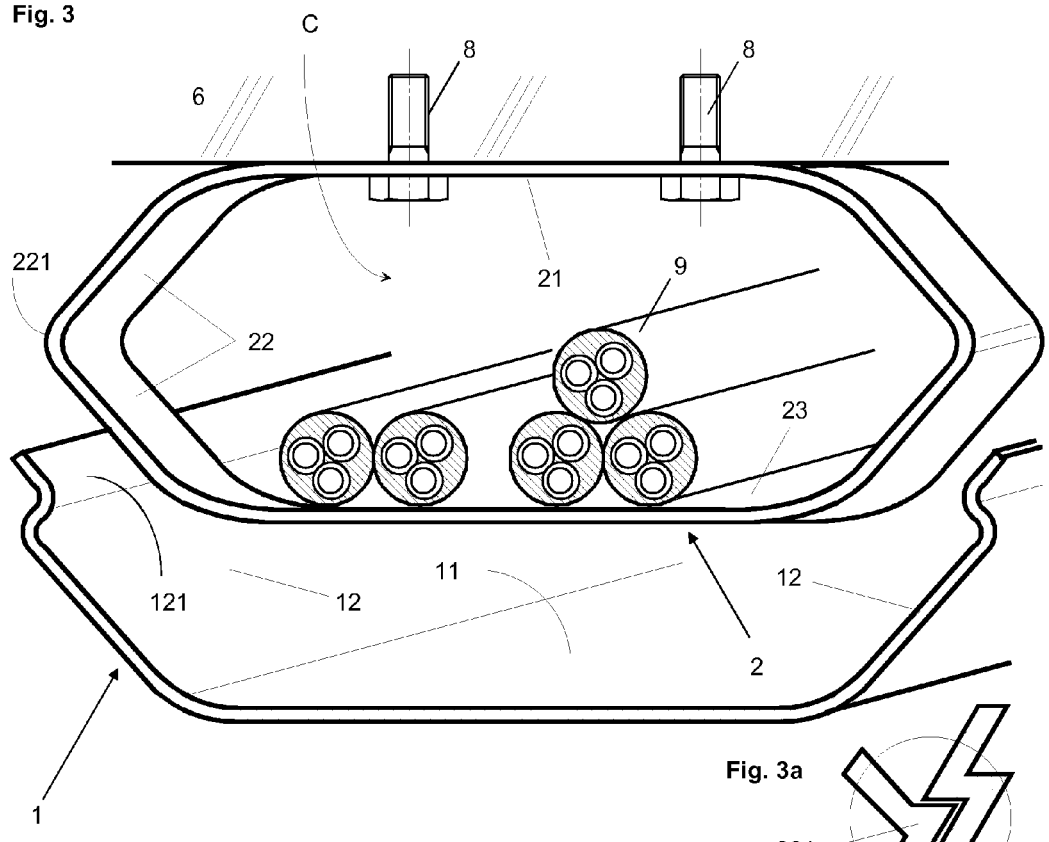
Fig. 3
Fig. 3a
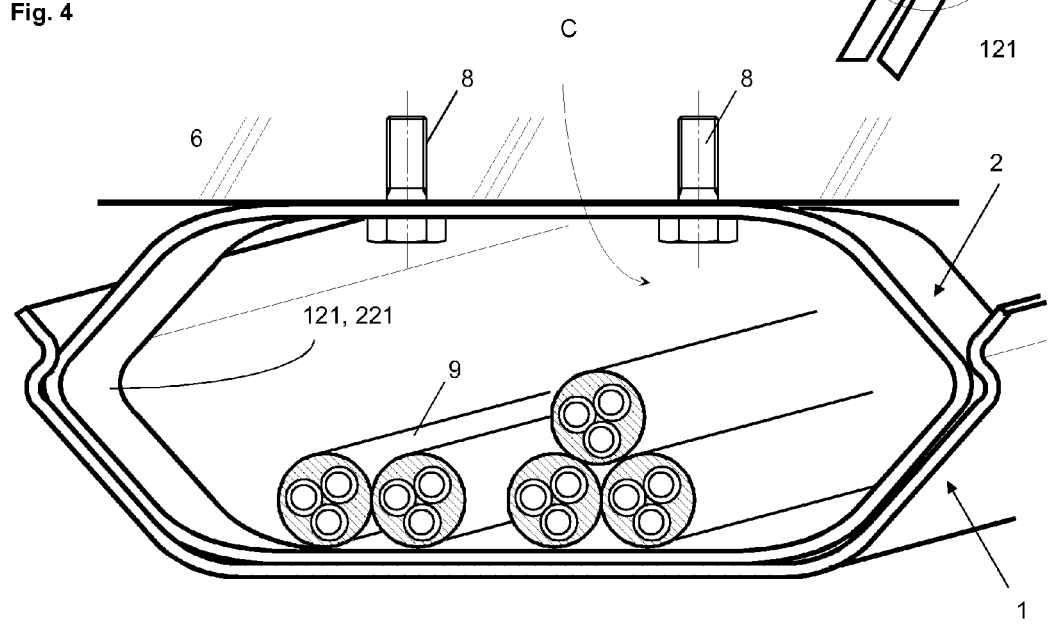
Fig. 4

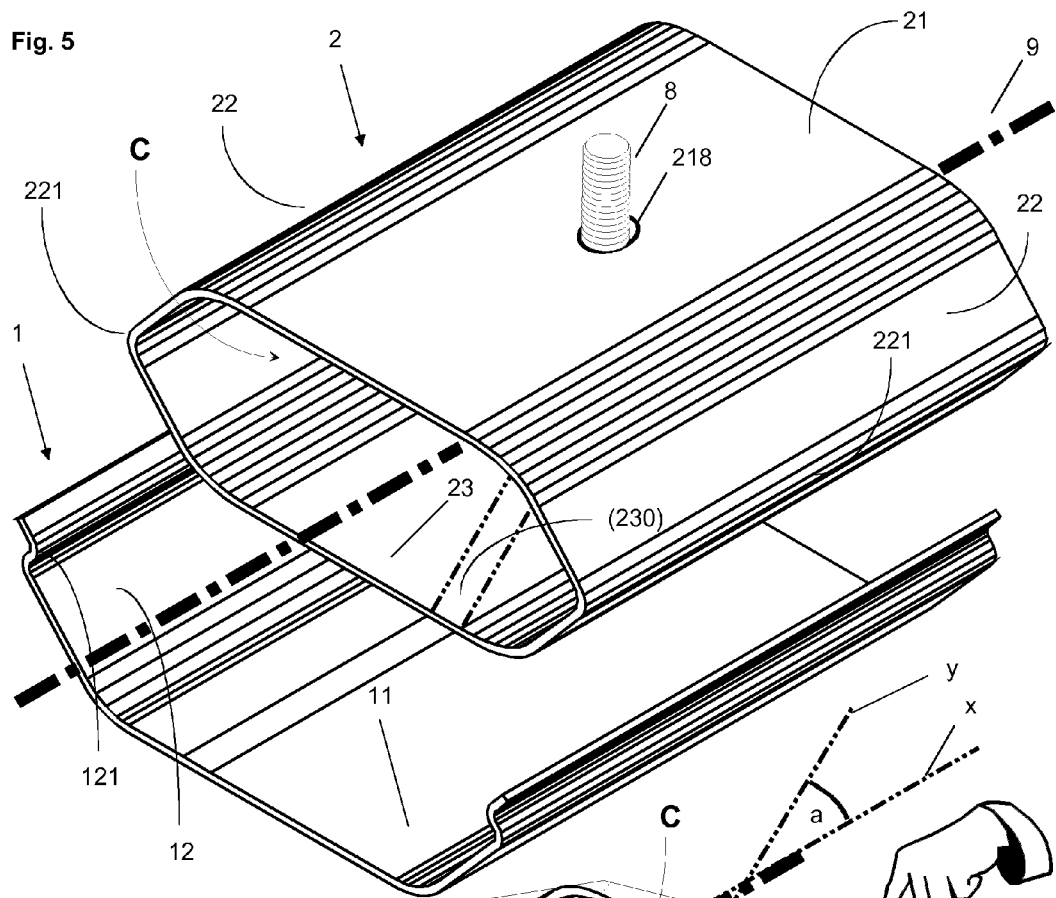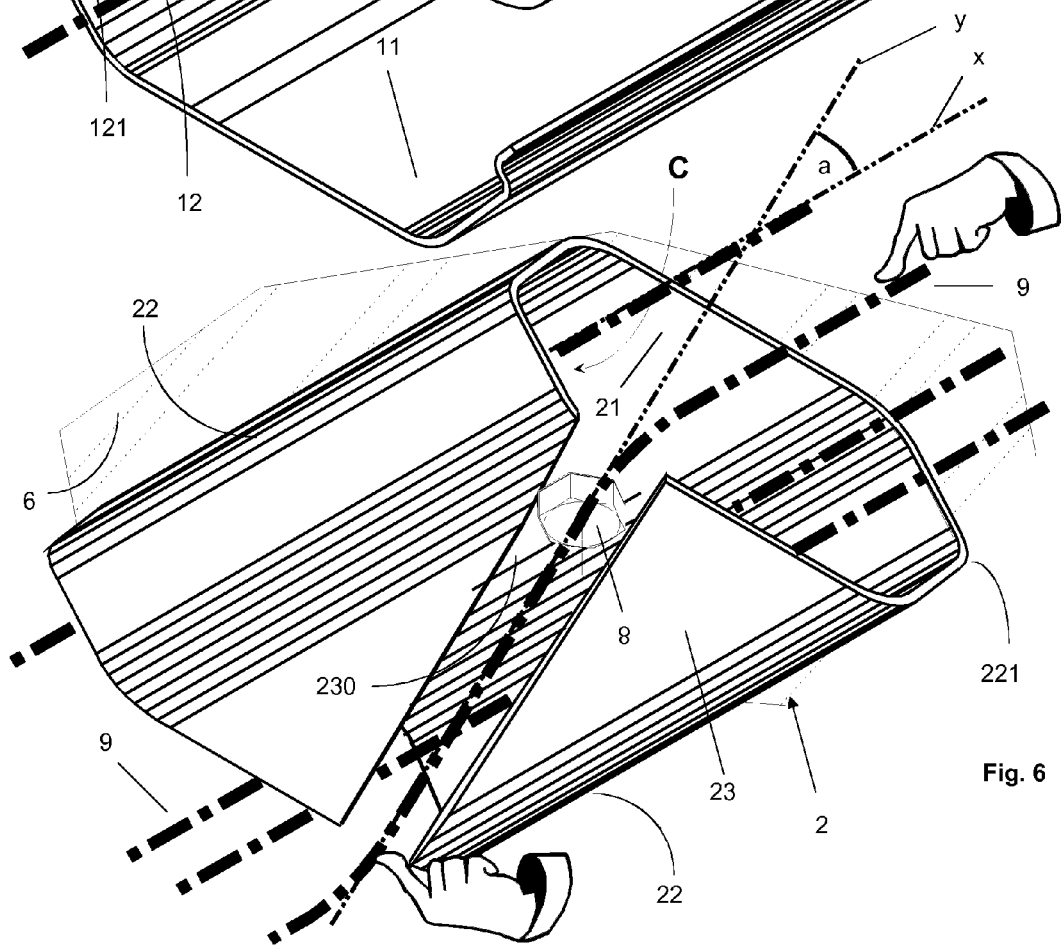

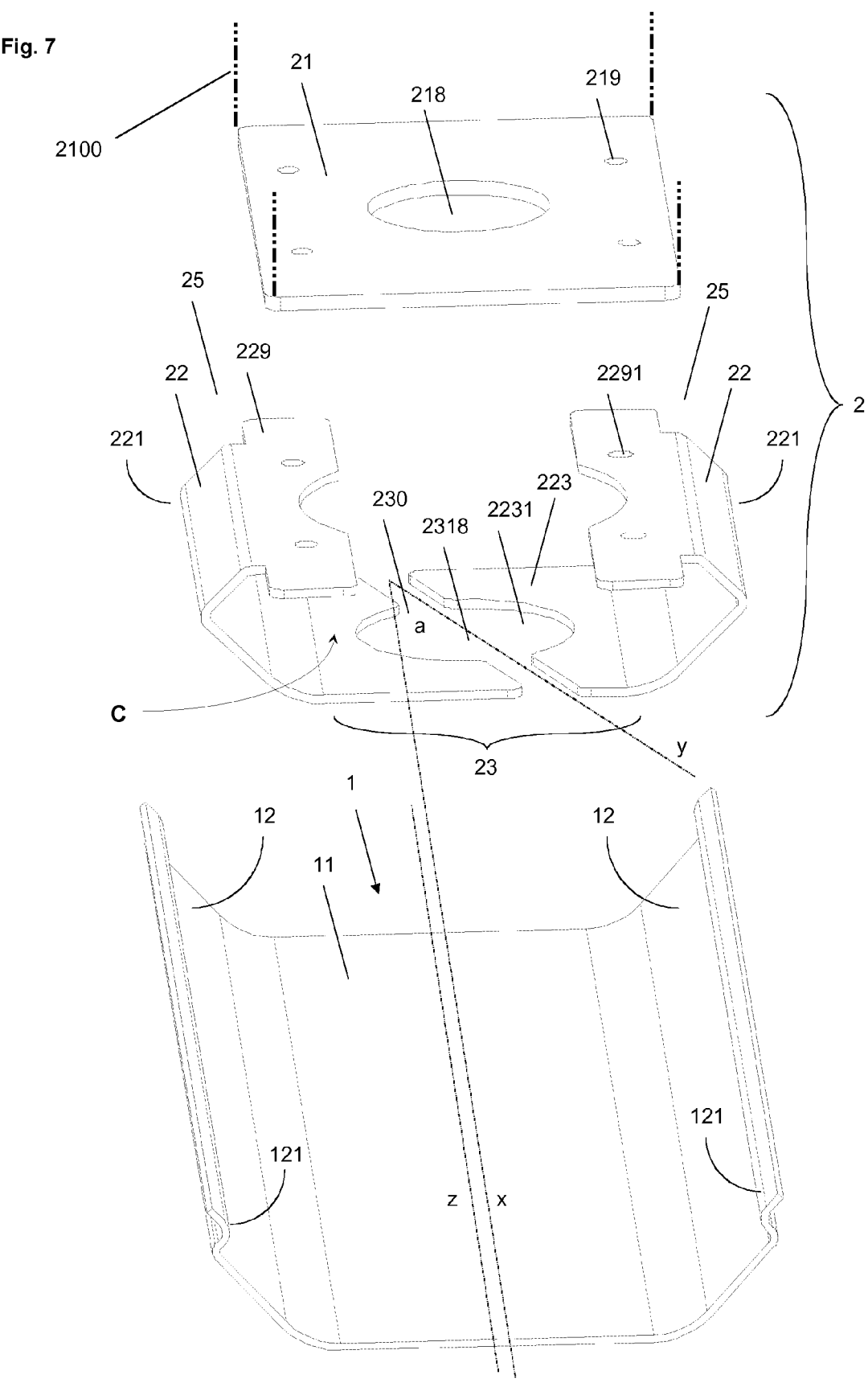

Fig. 12
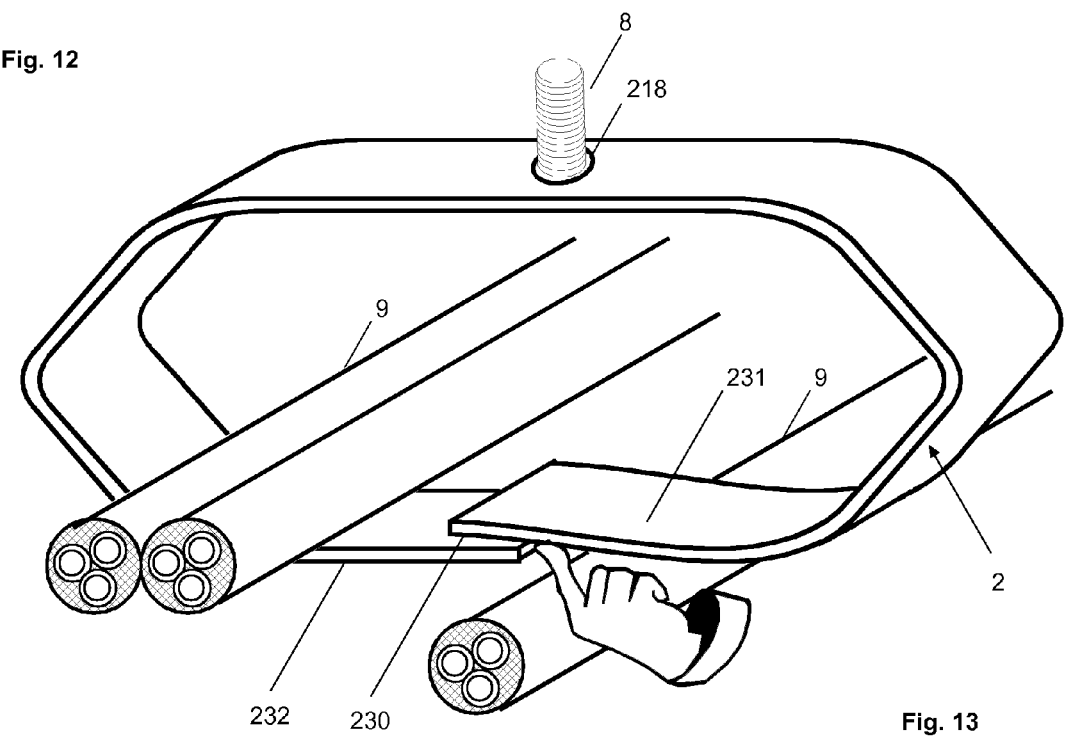
Fig. 13
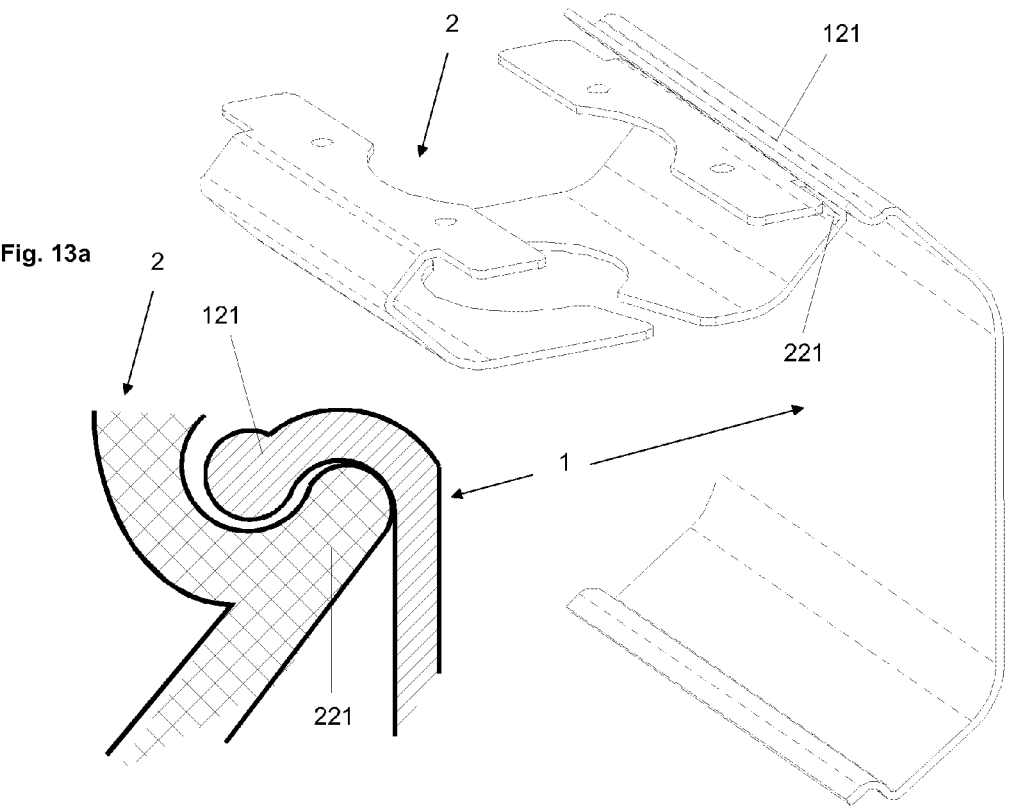
Fig. 13a

CABLE GUIDING DEVICE

SUMMARY OF THE INVENTION

The invention relates generally to a device for mounting and guiding cables, such as cable trays or cable ducts.

In commercial, industrial, and administrative buildings, cables, in particular cables for high power and low power systems, are—due to their lack of inherent stability—guided in cable ducts, e.g. from a central switch panel to the loads. Cable guiding devices of this type are known, for example, from European patent publication EP 1 505 705 A, to the present inventor.

FIG. 1, below shows a known cable guiding device with a cable guiding portion 100, i.e. the duct, equipped with slot-like openings 1111, having two side walls 112 with outward-turned end pieces 1121 connected by a bottom part 111. Cable guiding portion 100 is held by a mounting device 200, equipped with a bow 220 that is attached to the ceiling by means of a holder 210 and equipped at both sides with hooks 2201, which engage into the end pieces 1121 of the cable guiding portion 100. This solution represented in FIG. 1 has several disadvantages. On the one hand, mounting of the device 200 and of the cable guiding portion 100 as well as installing of cables 9 is relatively cumbersome. Connecting the bow 220 with the cable guiding portion 100 requires force acting on the side walls 112 to press them together so that the hooks 2201 can engage into the end pieces 1121. In view of the fact that the cable guiding portion 100 is to be mounted on the ceiling while the technician will usually be standing on a ladder, this mounting procedure is rather troublesome. It becomes significantly harder still if there are already cables 9 laid out in the cable guiding portion 100, which often are of considerable weight. If, on the other hand, a cable 9 is installed only after the cable guiding portion 100 is mounted, it is rather troublesome to insert it into the cable guiding portion 100 or duct. In addition, the device represented in FIG. 1 takes up much space and extends far into the room below the ceiling. For this, and other reasons, this device often does not meet the user's aesthetic requirements.

The mounting device 200 represented in FIG. 2 and known from my EP 1 505 705 A is equipped with a single-part or multi-part holder 210 to be mounted on the ceiling, which serves to hold a cable guiding portion 100, such as a cable duct. At its end directed towards the cable guiding portion 100, the holder 210 is rigidly connected to a bracket 220, which is provided with at least two catch elements 230 that can be passed through one of the openings 1111 each provided in the cable guiding portion 100 and can be screwlessly connected at the other side to a catch device 240 so that the cable guiding portion 100 (usually its bottom part 111) is fixed between the bracket 220 and the catch device 240. By means of such a device, significant disadvantages of the device represented in FIG. 1 are avoided.

Once the holder 210 is mounted to the ceiling (preferably bolted), the cable guiding portion 100 can be lifted in relation to the holder 210 until, after the catch elements 230 have passed the openings 1111 in the cable guiding portion 100, it touches the bracket 220, and the catch device 240 can be connected with the catch elements 230.

Connection of the catch device 240 with the catch elements 230 is done in a simple way, quickly with one movement and without the use of bolts or other connecting means. After mounting of the device, cables 9 can easily be placed into the cable guiding portion 100 or taken off again.

It has to be noted, though, that with this improved device, mounting still requires several manipulations, which requires corresponding efforts and time and may be inconvenient. Furthermore, this device, too, may not meet the user's aesthetical requirements.

With the devices represented in FIGS. 1 and 2, the cable guiding portion has to be completely mounted before cables can be installed. Hence, the cable guiding portion basically obstructs the installation of the cables, i.e. the cables have to be passed around the cable guiding portion to be inserted into the latter.

In addition, it has to be noted that with the devices represented in FIGS. 1 and 2, only ceiling mounting is possible but not, for instance, wall mounting.

On the other hand, several other devices known in the prior art are designed exclusively for wall mounting. In [2], EP 0 746 074 A1 to Kelly et al., and [3], DE 24 31 834 A1 to Rocek, cable guiding systems for cables to be laid out on wall surfaces are described. The known devices consist of bow-shaped cable clamps, that are arranged at some regular distances and having a wall-side fixture part and therefrom protruding arms with their free ends being inclined towards one another. Cable clamps of known cable guiding systems of this type are made of basically rigid materials, and the bent ends of the arms leave a slot open between each other of a width greater than the cable diameter, so that the cables can conveniently be inserted through the slot into the cable clamps and do not have to be inserted, i.e. threaded in from the side and pulled through. The wide slot, however, has the disadvantage that inserted cables may easily fall off the clamps, particularly if the device would be installed on the ceiling. For this reason, as described by Kelly and Rocek, known cable guiding systems comprise locking devices to close the slots after insertion of the cables. This, however, causes a significant complication of the installation procedure, since the slots have to be re-opened and closed again for any cable to be newly inserted or removed. Apart from other issues, this is one of the major disadvantages of known cable guiding systems, in particular since the necessity of special closing parts for the cable clamp slots does not only complicate the process of laying cables out but also means additional expenses regarding production and storage.

To avoid this disadvantage, particularly to avoid locking elements as they are shown in EP 1 168 555 A1 to Tassi, the device described by Rocek uses cable clamps with their ends inclined towards one another in such a way that a narrow insertion slot is formed with a width less than the usual cable diameters. Further, the arms of the cable clamps are resiliently deflectable, so that rather light cables can be pressed between the arms and held there. As to heavier cables, which cannot be held by the resilient arms, this device is inappropriate, in particular when mounting heavy cables on the ceiling, which by its weight would force the resilient arms apart.

DE 101 01 085 A1 to Kirsch, refers to a cable guiding system for technical furniture, where cables for electrical devices are to be routed and held in an orderly and clearly organized manner, GB 2 137 305 A to Gename presents a system for retrofit installation of cables. For the purpose of holding the cables, known clips or clamps are provided, by means of which light cables, e.g. television cables, can be held. For guiding of heavier cables, especially of power cables, however, the devices of Kirsch and Gename are neither designed nor appropriate.

GB 2 287 727 A to Fearon, presents a device to be mounted on the wall or on the ceiling to hold decorative coverings. GB 2 117 026 A to David et al. relates to a procedure for an under-roof mounting of a very elaborately designed device. Hence, the devices presented in Fearon and David are neither designed nor appropriate for the guidance of heavier cables, in particular of power cables.

SUMMARY OF THE INVENTION

Thus, the present invention was developed with the object of creating an improved cable guiding device, which avoids the disadvantages of the known devices.

An object of the present invention was in particular, to create a cable guiding device that can be manufactured with reduced effort and cost, that can be mounted quickly and safely particularly on the ceiling, and that comprises a mounting device, which can easily be connected with a cable guiding portion, preferably without screwing.

A further object of the present invention was, to create a cable guiding device that allows quick and flexible installation and de-installation of cables.

In view of the aesthetic appearance, it was desirable to create a cable guiding device that requires reduced space and that is of a favourable look.

These requirements are met by means of a cable guiding device, particularly a cable tray or a cable duct.

The cable guiding device, serving to mount a cable guiding device designed for the installation of cables, comprises a cable guiding portion, such as a duct, which is mounted and held by means of a mounting device. The mounting device comprises a holder that is made of one or more parts and that can be installed on an element of a building, e.g. on the ceiling, a column, a bar, a static support, etc.

According to the invention, the single-chambered or multi-chambered holder is embodied as ring-shaped or sleeve-shaped and is suited to at least partly enclose cables. The holder has an upper portion, a lower portion and at least two opposing side walls, which define a cavity with a longitudinal axis substantially parallel to the axis of the mounted cable guiding portion. The holder further comprises at least one longitudinal slot disposed at an angle relative to said longitudinal axis, said slot extending the length of said holder and providing access to the cavity. The cavity is dimensioned to receive and at least partially envelope a cable or plurality of cables disposed therein. The cable guiding portion, which comprises a bottom and first and second side walls, is attachable to said holder so as to cover said slot opening. Further, the cable guiding portion is dimensioned to clutch at least a portion of said holder. The cables can be inserted through at least one slot opening or can be threaded axially into the holder. In addition, the holder can be embedded into the cable guiding portion in a way that the latter at least partly encloses or clutches the holder, so that a preferably detachable connection results. The axis y of the slot opening is inclined at an angle a in relation to the longitudinal axis of the cable guiding portion so that cables inserted into the holder and oriented along this longitudinal axis will be firmly held by the holder. Due to the direction of the cables to be installed, the cable have to be turned to be inserted into the slot and will subsequently relax along the installation axis x.

This solution results in numerous advantages. For example, the mounting device itself serves for holding the cables, so that their installation can already be provisionally performed after the mounting devices have been attached, e.g. to the ceiling. The cables can be inserted and taken off again with little effort and, when having been inserted, are instantly stably supported. Hence the mounting device, in contrast to known solutions, already serves the installation of the cables, which, after the cable guiding portion has been mounted, only have to be embedded into it. As cables are already held by the mounting devices, a lower load results on the cable guiding portion, e.g. on the cable duct, so that the cable duct can be embodied, for instance, as a flexible device or as a rigid one of curved forms. Moreover, since the holder is preferably completely engulfed by the cable guiding portion, a minimal amount of space is required. Therefore, the mounted cable guiding device may be used as an aesthetic design element. If, for instance, a coloured cable guiding portion of serpentine shape is used, a viewer will not guess that cables are laid therein.

The cable guiding portion can be made of perforated or unperforated metal plates, of riveted elements, of wire grating, of rigid or flexible plastics, etc. The cable guiding portion can be equipped with flexible segments or joints, since, in contrast to traditional embodiments, it does not have to take the full load. It can also have specific forms, grooves, etc. that give it an optically pleasing appearance. In constructive respect, the length of cable guiding portions can be chosen freely, as their carrying capacity is dependent on the distance at which mounting elements are positioned ("support distance"). The width of cable guiding portions can constructively be chosen freely as well, according to the width of the holders. The side walls can be shaped and perforated in a way that apparatuses can be directly screwed to them.

The complete embedding of the holder into the cable guiding portion results in an advantageous interaction of holder and cable guiding portion. The holder is enclosed by the cable guiding portion, which results in a stable connection. The sleeve-shaped holder can directly border the walls of the cable guiding portion, so that the cross section size of the latter is only slightly larger than that of the holder. This means that the cross section of the holder interior serving to hold the cables is almost as large as the cross section of the cable holding device.

Holder and cable guiding portion are to be connected preferably by means of one or more first and second coupling elements, which may engage in a positively-fitting or interlocking manner. For example, wall elements of the holder and wall elements of the cable guiding portion are urged into one another, so that they border each other, at least partly, in interlocking manner. Preferably, the first and/or the second coupling elements are sufficiently elastic that with the application of force, the holder can be forced into the cable guiding portion or the cable guiding portion can be forced over the holder, whereby a snap-lock is formed. In this case, the holder and the cable guiding portion and the coupling elements are designed in such a way that the force necessary to unlock the snap-lock exceeds the force exerted by the installed cables.

Typically, the cable guiding portion has two side walls interconnected by a bottom part, with the second coupling elements embedded on these side walls (preferably on their end pieces), in a way that they are connectable in interlocking manner to the first coupling elements of the holder, which are provided at the respectively designed, for instance curved side walls of the mounting device.

An interlocking connection is to be preferred as it will always reliably connect or function, irrespective of the amount of cables lying on the cable duct.

The connection of the cable guiding portion—or its side walls, respectively—with the holder, can also be designed in a hinge-like manner. In that way, the cable guiding portion can, for instance, be laterally turned downwards if supplementary mounting work is to be done, thus providing access to each individual cable. Nevertheless, the cable ducts remain in place. Both, the force-locking and the interlocking, as well as the hinge-type connections can be additionally secured, e.g. by special bolts or seals. In that way, access of unauthorized persons to the cables can be prevented, or will at least not remain undetected. None of the so far existing constructions provides such safety combined with simultaneous complete accessibility.

The sleeve-shaped holder can be designed as a one-piece element and be equipped with one or more—preferably slantwise oriented or zigzagging—slot openings, which allows cable insertion from below into the holder. A cable can be inserted by application of force, if oriented slantwise through the slantwise oriented slot opening, and will then automatically be stretched by the existing tensile forces and, due to its axial orientation above the crosswise running slot opening below, will be held by the holder.

With a preferable embodiment, the sleeve-shaped holder consists of two fastening bows interconnected by a mounting plate, preferably of identical shape and with end pieces that, positioned at a certain distance from each other so as to form a slot opening, at their front sides run preferably along an axis that preferably forms an angle in the range of 45° with the longitudinal axis of the cable guiding portion (approx. +/−15° depending on the stiffness of the cables).

The width of the slot opening through which the cable is inserted is preferably chosen according to the largest cable diameter, so that the width of the slot opening is as small as possible but always big enough.

The holder has at least one mounting opening for lead-through of a mounting element by means of which the holder can be attached for instance to the wall or to the ceiling. Corresponding with this mounting opening, preferably a widening of the slot opening is provided which allows introduction of the mounting element through the slot opening into the mounting opening. The holder can thus be mounted without obstacles.

Auxiliary elements can be inserted into the cable guiding device, which, for example, are clamped between the end pieces or end strips of the cable guiding portion. In the preferably plate-shaped auxiliary elements, segments can be partially cut out and bent towards the interior of the cable guiding device, so as to arrange cables, to hold them, or to separate them from each other, which is of advantage in particular if the cable guiding device is mounted on a wall.

It is also possible to apply pre-punched such segments in the cable guiding portion so that they can be placed in the required direction.

The cable guiding portions are preferably stackable so that they can be easily stored and transported.

BRIEF DESCRIPTION OF THE DRAWINGS

Below, the invention will be explained in more detail by means of figures which represent the following:

FIG. 3 A mounting device according to invention, with a sleeve-shaped holder in which cables 9 have been inserted, and a cable guiding portion 1 designed correspondingly.

FIG. 3a A detailed representation of the coupling elements 121, 221.

FIG. 4 The holder 2 and the cable guiding portion 1 of FIG. 3, after mounting.

FIG. 5 The holder 2 and the cable guiding portion 1 of FIG. 3 in a further representation.

FIG. 6 The holder 2 of FIG. 5 (attached to a part of a building 6) being additionally equipped with a slot opening 230 that runs angled to the axis of the mounting device 2, and a cable 9 (oriented correspondingly) which is being inserted into opening.

FIG. 7 A mounting device 2 according to the preferred embodiment of the invention, with a holder 2 that has two identical, bow-type fastening bows 25, interconnectable by a mounting plate 21 that may be attached to a ceiling support 2100 if desired.

FIG. 12 A preferably designed holder 2 with a self-closing opening 230 formed by two overlapping parts 231, 232 of the lower wall element 23.

FIG. 13 A preferably designed holder 2 with a unilaterally hinged corresponding cable guiding portion 1, which, after installation of the cables can be turned upwards.

FIG. 13a A detailed representation of the preferably designed coupling elements 121, 221 for the holder 2 and the cable guiding portion 1 of FIG. 13.

DETAILED DESCRIPTION

Figure 1:
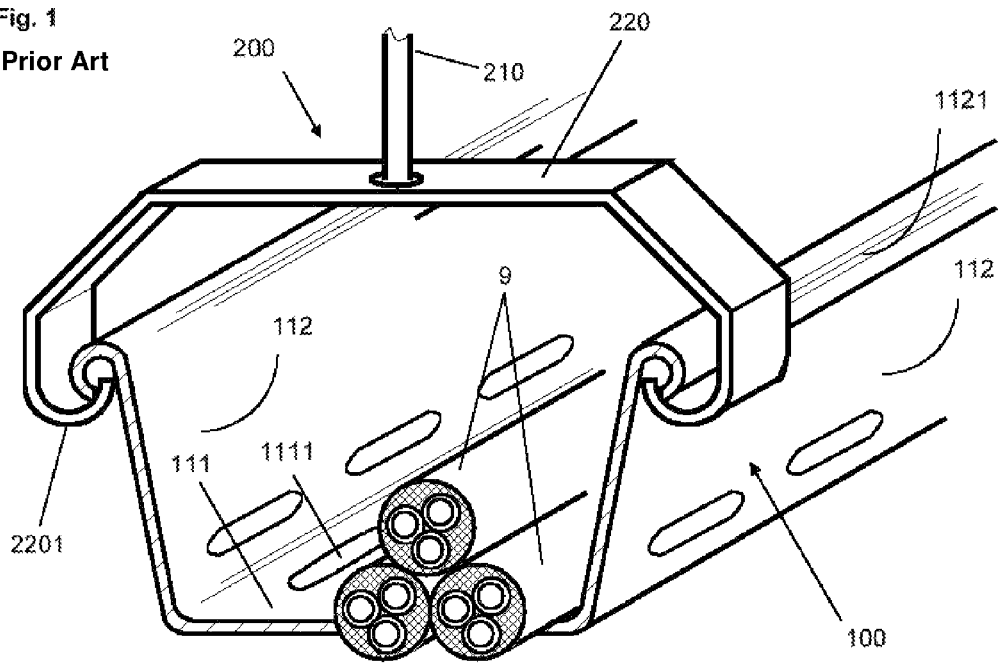
FIG. 1 A first known mounting device 100.
Figure 2:
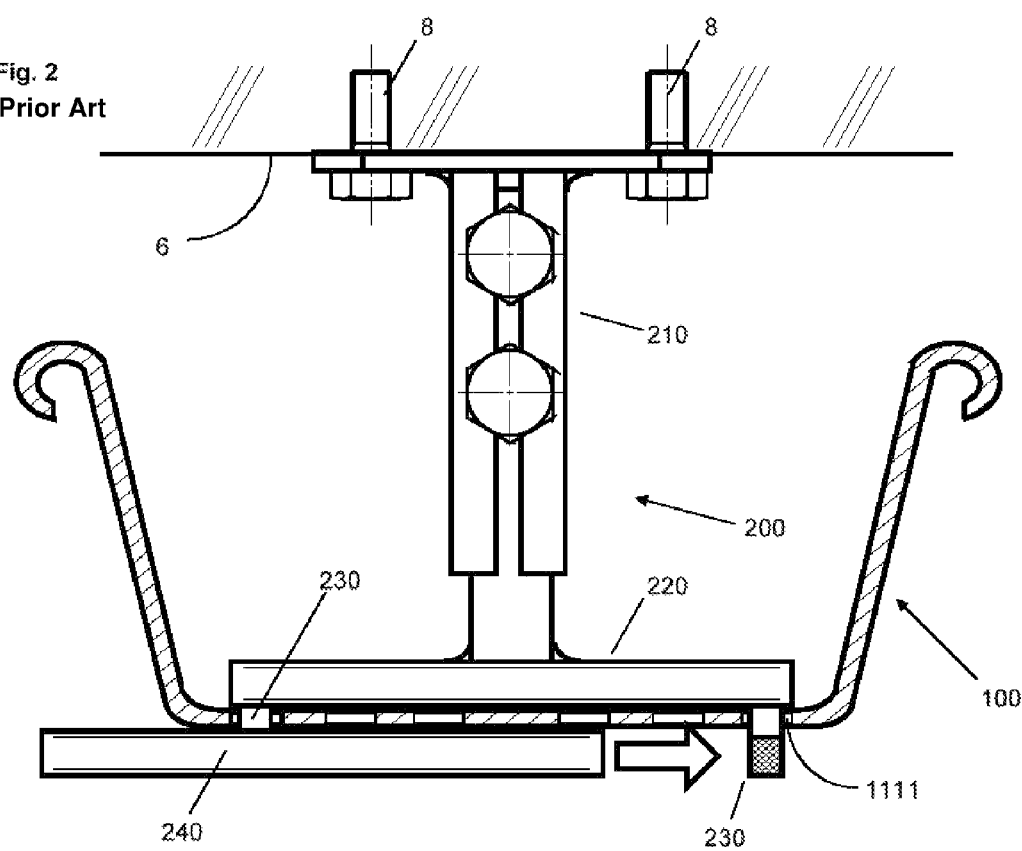
FIG. 2 A second known mounting device 100.

FIG. 1 and FIG. 2 show the initially described, known mounting devices.

FIG. 3 shows a mounting device according to an embodiment of the invention, with a holder 2 attached to the ceiling 6 of a building by means of mounting bolts 8, with cables 9 having been threaded into the holder in axial direction. The holder 2 is shown in a basic embodiment, and has an upper wall element 21, attached to the ceiling 6, and a lower wall element 23, on which the cables 9 are placed. Both wall elements 21, 23 are interconnected by side walls 22, whereby a sleeve or closed loop is formed. Therefore, once the required holders 2 have been mounted, the cable 9 to be installed can already be laid out, without the installation work being impeded by the cable guiding portion 1. The cable guiding portion 1, serving as an additional support of the installed cables 9 and as an optically pleasing covering, has not yet been mounted.

FIG. 4 shows the mounting device 2 of FIG. 3 after mounting of the cable guiding portion 1. The holder 2 is engulfed by the cable guiding portion 1, which has two side walls 12, interconnected by a bottom part 11, with coupling elements 121 being provided at the side walls, which will interact with the coupling elements 221 provided at the side walls 22 of the holder 2. After mounting, the holder 2 will be partly enclosed by the approximately U-profile-shaped cable guiding portion 1, or, respectively, be clutched by the coupling elements 121 provided at the exterior margin of the side walls 12, so as to form a connection that can only be detached by application of force.

Mounting of the cable guiding portion 1 is done by pressing the latter against the holder 2, thus pressing the side walls 12 of the cable guiding portion 1 apart until their coupling elements 121 have passed over the coupling elements 221 of the holder 2 and snapped into place. This mechanism forms a snap-lock, which allows rapid mounting and de-mounting of the cable guiding portion 1. The force required to mount the cable guiding portion 1 and detach it again is chosen according to the weight of the cables 9 to be installed and is determined by the materials used, by their thickness, as well as by the shape of the coupling elements 121, 221.

FIG. 3a shows the coupling elements 121, 221, which engage in a form-locking manner such that they are not detachable from each other by the forces exerted by the installed cables 9 in parallel to gravity. In this case, the side walls 12 of the cable guiding portion 1 have to be stretched apart to detach the latter.

After mounting of the cable guiding portion 1 shown in FIG. 4, the wall elements 22, 23 of the holder 2 and the wall elements 11, 12 of the cable guiding portion 1 are urged into one another in such a way that they border each other in an at least partly form-locking manner.

FIG. 5 shows the mounting device 2 with a cable 9 inserted therein, as well as the cable guiding portion 1 of FIG. 3, viewed from above.

FIG. 6 shows the holder 2 of FIG. 5, attached to a part of a building, e.g. the ceiling 6. The holder 2 has an upper portion 21, a lower portion 23 and two opposing side walls 22, which define a cavity C with a longitudinal axis x substantially parallel to the axis z of the cable guiding portion 1, when mounted (see FIG. 7 and FIG. 8). The holder 2 further comprises a longitudinal slot 230 extending along an axis y disposed at an angle a relative to said longitudinal axis x or z. Said slot extending the length of said holder and providing access to the cavity C which is dimensioned to receive and at least partially envelope cables 9 disposed therein. The cable guiding portion 1, which comprises a bottom 11 and first and second side walls 12, is attachable to said holder 2 so as to cover said slot opening 230 (see FIG. 9). Further the cable guiding portion 1 is dimensioned to clutch at least a portion of said holder 2. In FIG. 6 it is further shown that a cable 9 is oriented in parallel to the slot-opening 230, while it is being introduced through the slot-opening 230 into the cavity C. Further cables 9 have already been inserted and have aligned axially, so that they are prevented from getting out of the slot-opening 230. Therefore, with this embodiment of the holder 2, it is not necessary to thread a cable 9. Cables 9 can quickly and comfortably be inserted through the slot-opening 230 and will immediately be held, since a cable 9 will automatically align axially to the holder 2 according to the tensile forces acting on it.

The holder 2 of FIG. 5 or FIG. 6 can, for instance, also be mounted on a wall along which a cable 9 is to run, for example horizontally or vertically. In this case, too, the embodiment of the holder 2 of FIG. 6 allows a quicker and more comfortable installation of cables 9.

FIG. 7 shows a mounting device 2 according to the invention, with a holder 2 that has two identical fastening bows 25 interconnectable by a mounting plate 21. After connection of the two fastening bows 25 with the mounting plate 21, a holder 2 results that is basically of the type shown in FIG. 6.

Each fastening bow 25 contains a wall element 22, at the top of which, a connection plate 229 is disposed for connection with the mounting plate 21, and at the bottom of which a wing element 223 is provided to carry the cable 9. Connection plate 229 and mounting plate 21 have openings 2291 or 219, respectively, into which connecting elements like rivets or bolts can be inserted.

After connection of the fastening bows 25 with the mounting plate 21, the wing elements 223 are oriented towards each other and, with their front sides, border the slantwise running slot-opening 230. Furthermore, the wing elements 223 have cut-outs 2231, which form a circular extension 2318 of the slot opening 230, through which the mounting tools can be introduced to attach the mounting plate 21 (via its mounting opening 218) to a building part 6. Hence, the holder 2 does not only allow simple insertion of cables 9 but can also be easily attached to a building part 6. The mounting opening 218 provided in the mounting plate 21 has a relatively large diameter, thus allowing to orient the holder 2 according to given requirements after it has been fixed by means of a mounting bolt and a washer.

Due to the use of two identical wall elements 22, which can be stamped, bent, and interconnected with the mounting plate 21 at minimal expense, the holder 2 can be produced extremely cost-effectively.

Additionally, FIG. 7 shows that the holder 2 can also be attached to the ceiling 6 by means of a connection element 2100, for instance by means of a ceiling support.

Figure 8:
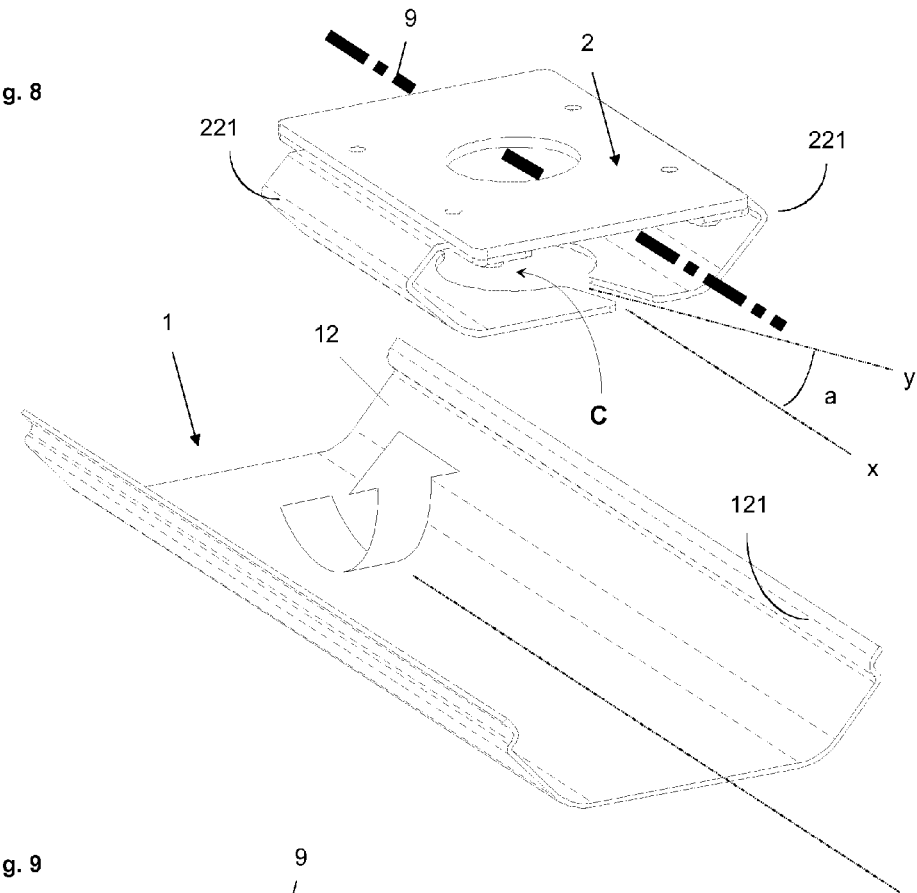
FIG. 8 The mounting device 2 of FIG. 7, with the assembled holder 2, into which a cable 9 has been inserted.

FIG. 8 shows the mounting device 2 of FIG. 7 with the assembled holder 2, into which a cable 9 has been inserted. After assembly of the holder 2 and insertion of cables 9, the cable guiding portion 1 is lifted and pressed over the holder 2, so that all cables 9 are engulfed by the cable guiding portion 1.

Figure 9:
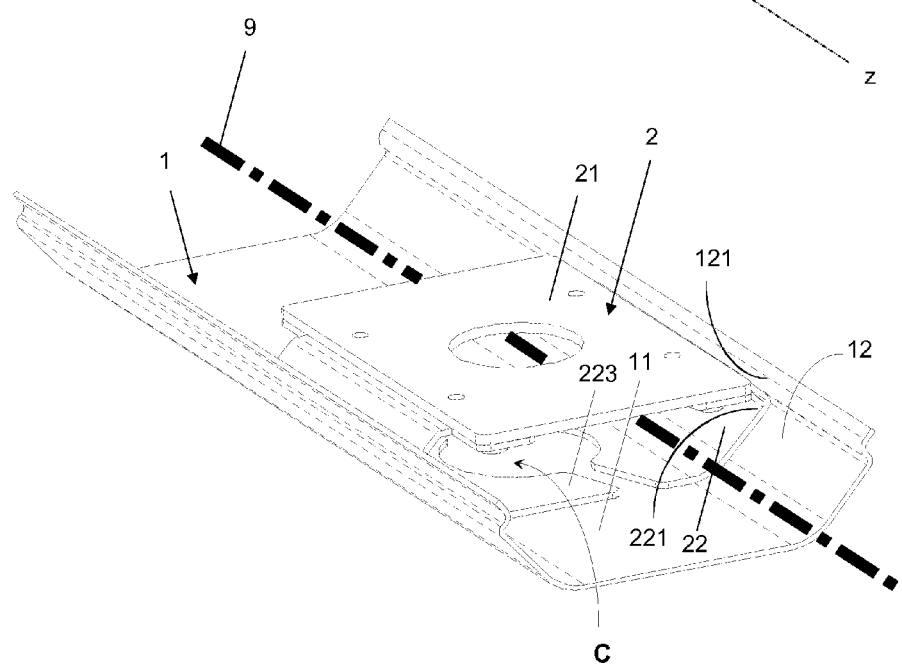
FIG. 9 The mounting device 2 of FIG. 7, with the assembled holder 2, engulfed by the cable guiding portion 1.

FIG. 9 shows the holder 2 being almost completely engulfed by the cable guiding portion 1. It can be seen that the wall elements 22, 221 of the holder 2 and the wall elements 12, 121 of the cable guiding portion 1, respectively, border each other in a practically form-locking manner and that the coupling elements 121, 221 are coupled to each other. Further, it can be seen in FIG. 9 that the mounted cable guiding portion 1 covers the slot-opening 230 of the holder 2, thus closing the cavity C on its lower side. Hence, the slot-opening 230 is no longer accessible.

As further can be seen from FIG. 9 the cross section of the cable guiding portion 1, when mounted, is practically not reduced by the thin wall elements 22, 223 holder 2 inserted therein. Hence practically the full cross section of the cable guiding portion 1 remains available for the installation of cables 9.

Figure 10:
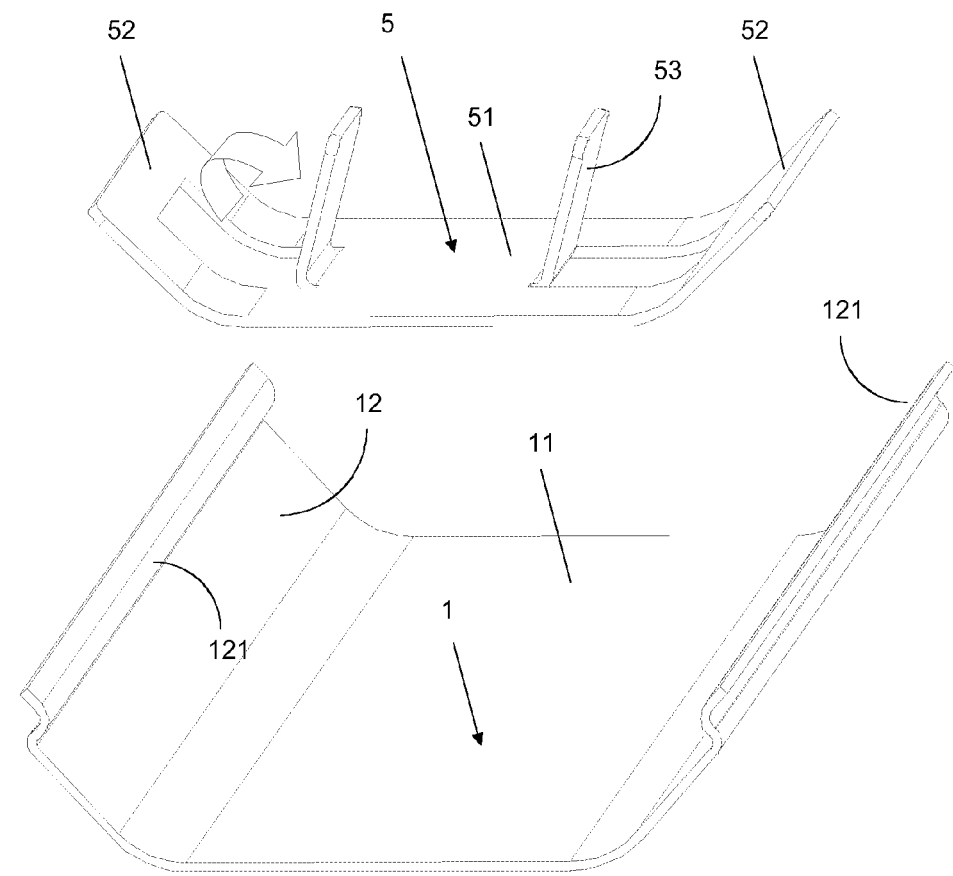
FIG. 10 A cable guiding portion 1 according to one of the previous FIGS. 1-9, with a fitting auxiliary element 5.

FIG. 10 shows a cable guiding portion 1 according to one of FIGS. 1 to 9, with a fitting auxiliary element 5 by means of which the installed cables 9 can be arranged and/or held, which may be necessary, for instance, if the cable guiding device is wall-mounted.

As described above, the cable guiding portion 1 has inwardly curved end strips 121 at the edges of its side elements 12, by means of which the cable guiding portion 1 can be coupled to a holder 2. The auxiliary element 5 consists of a slightly bent metal plate with two segments 53 partially cut out and bent upwards, so that cables 9 can be held between them.

Figure 11:
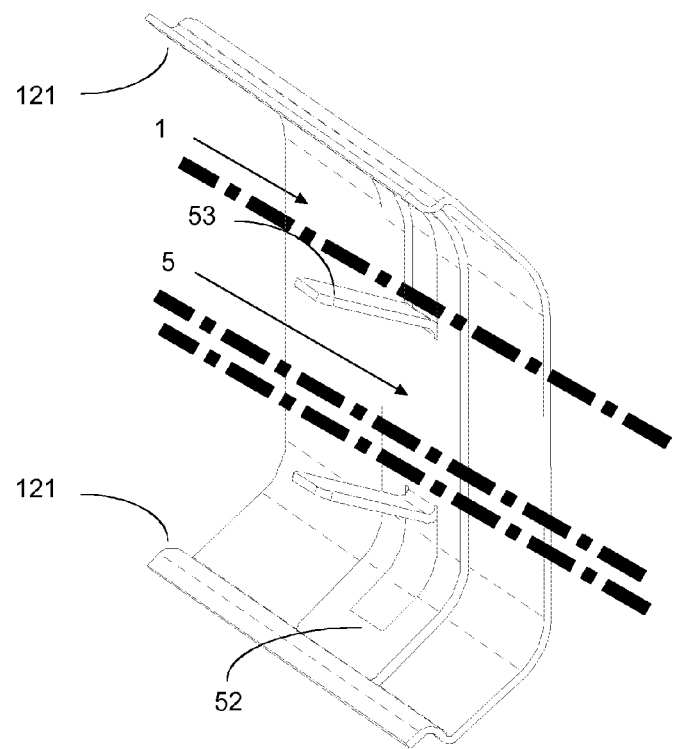
FIG. 11 The auxiliary element 5 of FIG. 10, connected with the cable guiding portion 1 which is oriented for wall mounting.

FIG. 11 shows the auxiliary element 5 of FIG. 10, connected to the cable guiding portion 1 (which is oriented for wall mounting) with the auxiliary element being clamped between the end strips 121.

FIG. 12 shows a preferably embodied holder 2 with a self-closing opening 230 that is formed by two overlapping parts 231, 232 of the lower wall element 23 of the holder 2. For installation of a cable 9, part 231 is lifted, whereby the opening 230 is laid open so that the cable 9 can be inserted. Subsequently, the opening 230 will close automatically. Self-closing openings 230 of this type can be realized in different ways, for instance also by means of a latch.

FIG. 13 shows a preferably embodied holder 2 with a corresponding cable guiding portion 1 hinged on one side, which can be turned upwards after installation of cables 9. This embodiment is particularly advantageous if cables 9 are to be supplemented or replaced. In that case, one side of the cable guiding portion 1 can be detached, and after completion of the task, be turned upwards again.

FIG. 13a gives a detailed representation of preferably embodied coupling elements 121, 221 for the holder 2 and the cable guiding portion 1 of FIG. 13. In the depiction, the cable guiding portion 1 is hinged only unilaterally.

Figure 14:
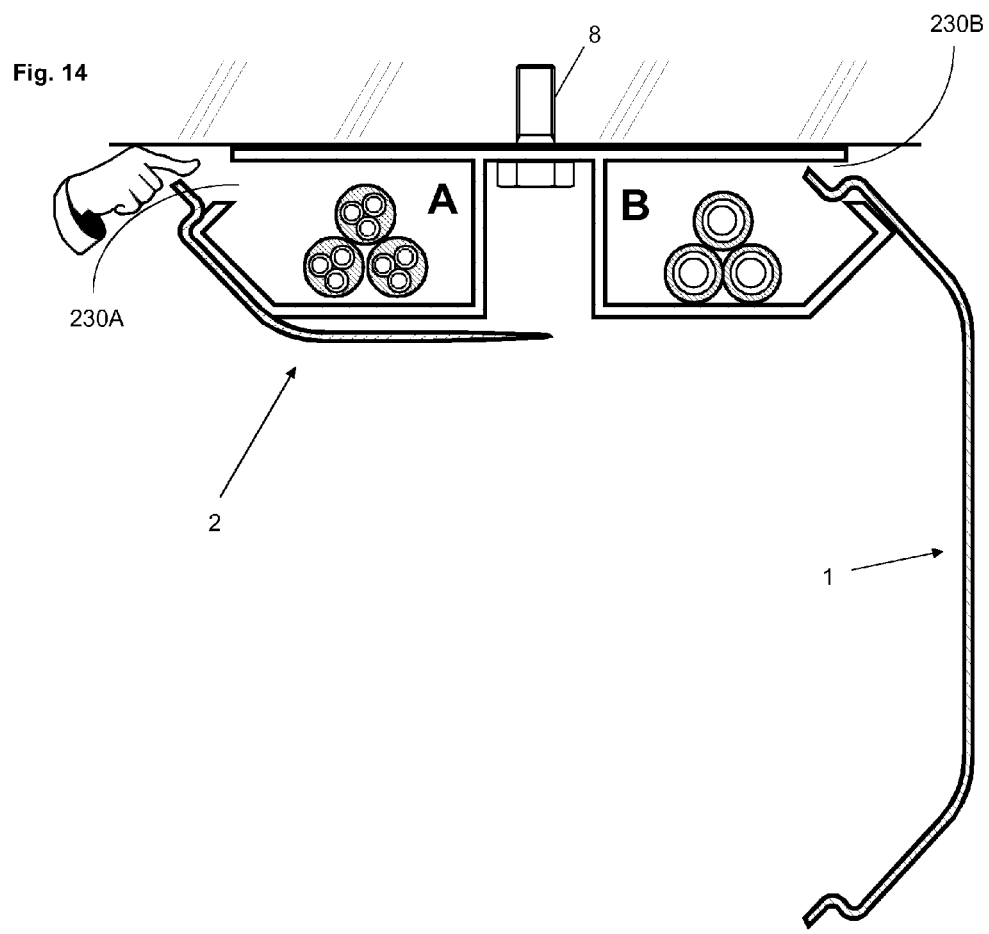
FIG. 14 A preferably designed holder 2 with two chambers A, B, which each have an access opening 230A or 230B, respectively.

FIG. 14 shows a preferably embodied holder 2 with two chambers A, B, each having an access opening 230A or 230B, respectively, through which, even after installation of the cable guiding portion 1, cables 9 can be inserted. Cables 9A, 9B can be separated according to their properties. For instance, communication cables may be laid out in chamber A, whereas current carrying cables are laid out in chamber B. At the left side of FIG. 14, it is shown that cables 9 can still be inserted into the cable guiding portion 1 after its mounting.

Figure 15:
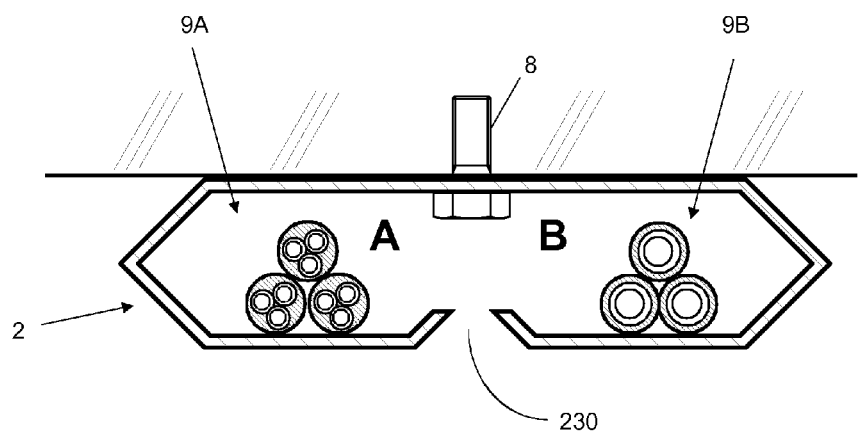
FIG. 15 A preferably designed holder 2 with two chambers A, B, which have a common access opening 230; and, FIG. 16 The holder 2 of FIG. 5, which, at least at one side wall 22, is equipped with openings 228 through which a tool 4 for detaching the cable guiding portion 1 can be introduced.

FIG. 15 shows a preferably embodied holder 2 with two chambers A, B, having an access opening 230 each, through which cables 9A and 9B can be inserted and laid out in an ordered manner in chambers A, B.

Hence according to the above explanations, the holder 2, embeddable in the cable guiding portion 1 and carrying a significant proportion of the weight of the installed cables 9, can be embodied differently and be adapted respectively to the users' requirements.

Figure 16:
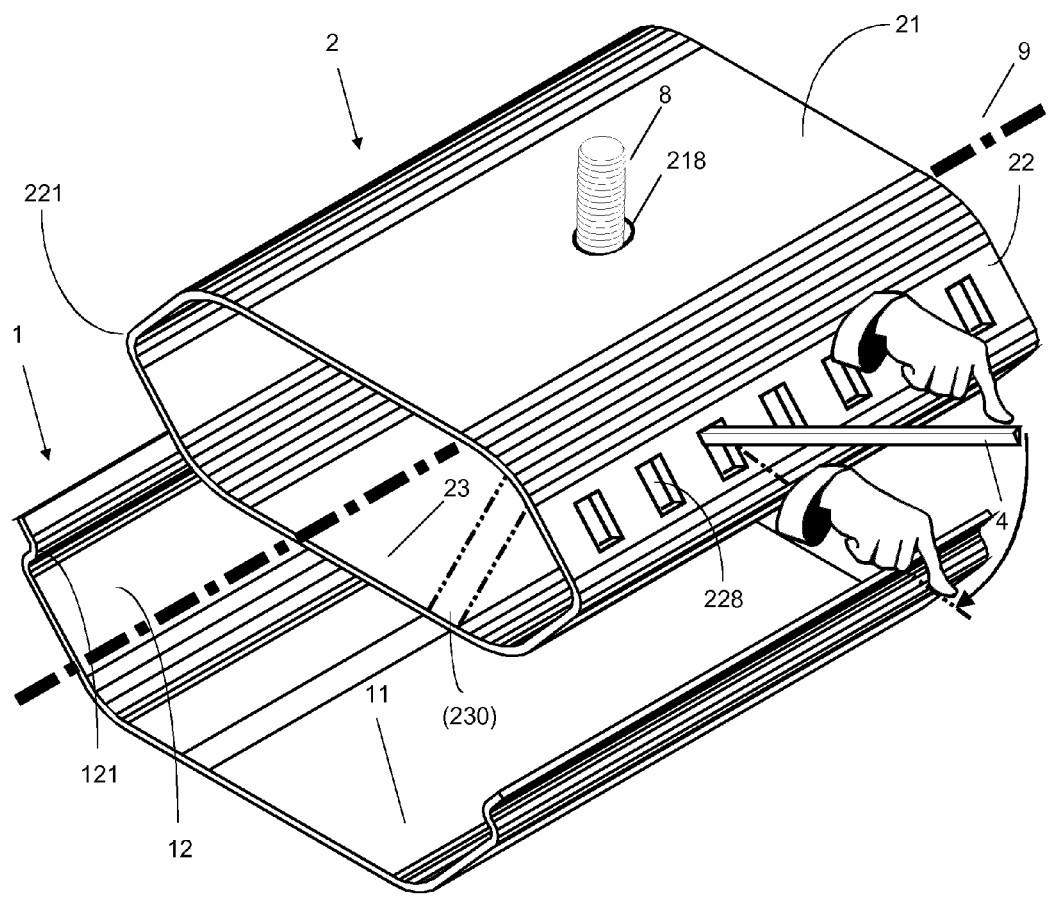

FIG. 16 shows the holder 2 of FIG. 5, which, at least at one side wall 22, is equipped with openings 228, into which a tool 4 for detaching the cable guiding portion 1 can be introduced. Since the cable guiding portion 1 is pressed onto the holder 2 or preferably a snap-lock results, which can be unlocked only by applying a correspondingly high force. In particular, if the parts engage, it does not preferably suffice if the cable guiding portion 1 is pulled down with high force, for instance by the weight of the cables 9. Nevertheless, it would be desirable, in particular with changes to the cable installation (for instance with laying out additional cables 9), if the stable connection between the holder 2 and the cable guiding portion 1 could be detached with little effort and with only little application of force. To this end, preferably slot-type openings 228 are provided, preferably at the upper parts of each side wall 22 of the holder 2, into which the bar-shaped tool 4, for example a screw-driver, can be inserted. By inserting the screw-driver 4 into an opening 228 and then pulling it downwards manually, the cable guiding portion 1, or the snap-lock, respectively, can be elegantly unlocked.

The invention claimed is:

1. A cable guiding device with a cable guiding portion that serves for guiding installed cables and that is held by a mounting device:

said mounting device comprising:
a holder mountable to a building part, having an upper portion, a lower portion and at least two opposing side walls, which defines a cavity having a holder longitudinal axis substantially parallel to a longitudinal axis of said cable guiding portion, said holder comprising at least one longitudinal slot having a slot longitudinal axis disposed at an angle relative to said holder longitudinal axis, said slot extending the length of said holder and providing access to said cavity which is dimensioned to receive and at least partially envelope a cable disposed therein;

said cable guiding portion comprising a bottom and a first and a second side walls, the cable guiding portion being attachable to said holder so as to cover said slot opening;

wherein said cable guiding portion is dimensioned to clutch at least a portion of said holder.

2. A cable guiding device as claimed in claim 1, wherein said holder comprises a mounting plate and at least two fastening bows, each comprising a side wall and a bottom wing, said bottom wings forming at least a portion of said lower portion.

3. A cable guiding device as claimed in claim 2, wherein said cable guiding portion further forms an articulating relationship with said holder, opposite said first and second coupling portions, so as to allow hinged movement of said cable guiding portion relative to said holder.

4. A cable guiding device as claimed in claim 2, wherein said first mounting portion is disposed at one of said side walls of the holder, and said second coupling portion is disposed at one of said side walls of the cable guiding portion, and further comprising a third mounting portion disposed at the opposing side wall of said holder and a fourth mounting portion disposed at the opposing side wall of said cable mounting portion, and wherein when said cable guiding portion is urged against said holder, an interlocking relationship is further formed between said third and fourth mounting portions.

5. A cable guiding device as claimed in claim 1 wherein said holder further comprises a first coupling portion, and said cable guiding portion further comprises a second, corresponding coupling portion, and wherein when said first and second coupling portions are urged against each other, an interlocking relationship is formed between said holder and said cable guiding portion.

6. A cable guiding device as claimed in claim 1 wherein the shape of said holder approximates the shape of a ring or a sleeve.

7. A cable guiding device as claimed in claim 1, wherein said slot further defines an enlarged open section dimensioned to introduce a tool therethrough, to facilitate mounting of said holder to a building part.

8. A cable guiding device as claimed in claim 1, wherein said cable guiding portion comprises flexible segments or joints.

9. A cable guiding device as claimed in claim 1, wherein said cable guiding portion further having inwardly curved strips to act as mounting portions to latch onto said holder.

10. A cable guiding device as claimed in claim 1, further comprising at least one plate shaped auxiliary element inserted into said cable guiding portion and attachable thereto, said auxiliary element having at least one segment extending inwardly.

11. A cable guiding device as claimed in claim 1, wherein the angle defined by the longitudinal slot and said longitudinal axis is selected in the range between 30° to 60.

12. A cable guiding device as claimed in claim 1, comprising a plurality of holders holding at least one of said cable guiding portions extending between said plurality of holders to form a cable tray.

13. A cable guiding device as claimed in claim 1, wherein said slot further defines an enlarged open section dimensioned to introduce a tool therethrough, to facilitate mounting of said holder to a building part.

14. A cable guiding device as claimed in claim 1, wherein said slot further defines an enlarged open section dimensioned to introduce a tool therethrough, to facilitate mounting of said holder to a building part.

15. A cable guiding device with a cable guiding portion that serves for guiding installed cables and that is held by a mounting device:

said mounting device comprising:

a holder mountable to a building part, having an upper portion, a lower portion and at least two opposing side walls, which defines a cavity having a holder longitudinal axis substantially parallel to a longitudinal axis of said cable guiding portion, said holder comprising at least one longitudinal slot having a slot longitudinal axis disposed at an angle relative to said holder longitudinal axis, said slot extending the length of said holder and providing access to said cavity which is dimensioned to receive and at least partially envelope a cable disposed therein, said holder further comprises a first coupling portion disposed at one of said side walls of the holder;

said cable guiding portion comprising a bottom and a first and a second side walls, the cable guiding portion being attachable to said holder so as to cover said slot opening, said cable guiding portion further comprising a second coupling portion disposed at one said side walls of the cable guiding portion;

wherein when said first and second coupling portions are urged against each other, an interlocking relationship is formed between said holder and said cable guiding portion.

16. A cable guiding device as claimed in claim 15, further comprising a third mounting portion disposed at the opposing side wall of said holder and a fourth mounting portion disposed at the opposing side wall of said cable mounting portion, and wherein when said cable guiding portion is urged against said holder, an interlocking relationship is further formed between said third and fourth mounting portions.

17. A cable guiding device as claimed in claim 15, wherein said cable guiding portion comprises flexible segments or joints.

18. A cable guiding device as claimed in claim 15, wherein said cable guiding portion further having inwardly curved strips to act as mounting portions to latch onto said holder.

19. A device for mounting and at least partially enclosing cables, comprising:

a holder mountable to a building part, having an upper portion, a lower portion and at least two opposing side walls, and further having a longitudinal axis substantially parallel to an intended direction of cables mounted thereby;

the holder comprising a plurality of chambers, each having a longitudinal slot extending the length of said holder, said slots located proximally to or at said upper portion;

a cable guiding portion comprising a bottom and a first and second side walls, the cable routing portion being attachable to said holder, and dimensioned to clutch thereto;

said holder further comprises a first coupling portion disposed at one of said holder side walls, and said cable guiding portion further comprises a second, corresponding coupling portion disposed at one the cable guiding portion side walls, and wherein when said first and second coupling portions are urged against each other, an interlocking relationship is formed between said holder and said cable guiding portion.

* * * * *